United States Patent [19]

Ring

[11] Patent Number: 4,964,931
[45] Date of Patent: Oct. 23, 1990

[54] TIRE BEAD SETTER APPARATUS AND METHOD

[75] Inventor: Ralph D. Ring, Akron, Ohio

[73] Assignee: The Goodyear Tire & Rubber Company, Akron, Ohio

[21] Appl. No.: 333,107

[22] Filed: Apr. 4, 1989

[51] Int. Cl.$^5$ .............................................. B29D 30/48
[52] U.S. Cl. ...................... 156/131; 156/403
[58] Field of Search ............. 156/131, 403, 132, 400

[56] References Cited

U.S. PATENT DOCUMENTS

| | | | |
|---|---|---|---|
| 3,121,653 | 2/1964 | Trevaskis | 156/403 |
| 3,434,897 | 3/1969 | Caretta et al. | 156/403 X |
| 3,556,900 | 1/1971 | Edney et al. | 156/403 |
| 3,839,115 | 10/1974 | Leblond et al. | 156/131 |
| 4,190,482 | 2/1980 | Yabe | 156/403 |
| 4,264,387 | 4/1981 | Allitt | 156/131 |
| 4,369,086 | 1/1983 | Nakahama et al. | 156/403 |

FOREIGN PATENT DOCUMENTS

| | | | |
|---|---|---|---|
| 1158969 | 12/1983 | Canada | 156/403 |
| 0658003 | 8/1980 | U.S.S.R. | 156/403 |

Primary Examiner—Michael W. Ball
Assistant Examiner—Geoffrey L. Knable
Attorney, Agent, or Firm—Frederick K. Lacher; T. P. Lewandowski

[57] ABSTRACT

A bead setter applier assembly (10) for positioning a tire bead (50) around a tire casing on a tire building drum wherein the assembly (10) has an annular frame member (12), a plurality of clamp segments (16) and a plurality of magnetic segments (34) pivotally mounted on the frame member (12). The bead ring (50) is placed on the magnetic segments (34) which have been rotated radially inward. The clamp segments (16) are rotated radially inward into engagement with the bead ring (50) to position the bead ring (50) in a location concentric with the central axis (A—A) of the assembly (10) and hold the bead ring (50). The magnetic segments (34) are then rotated radially outward out of engagement with the bead ring (50). After the tire casing is expanded into contact with the bead ring (50), the clamp segments (16) are retracted so that the assembly (10) can be moved away from the drum.

8 Claims, 3 Drawing Sheets

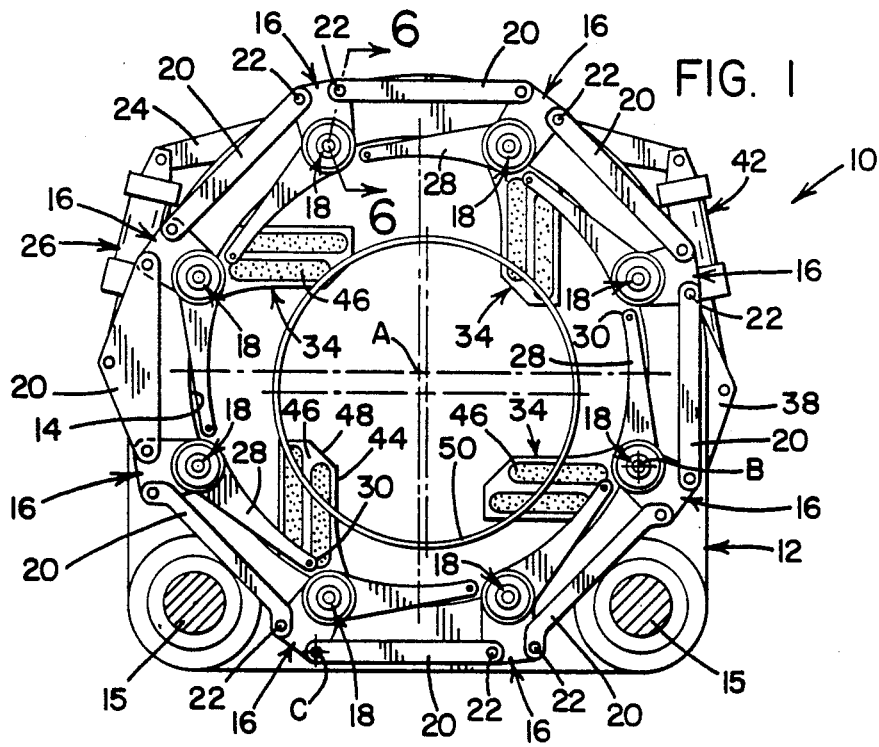
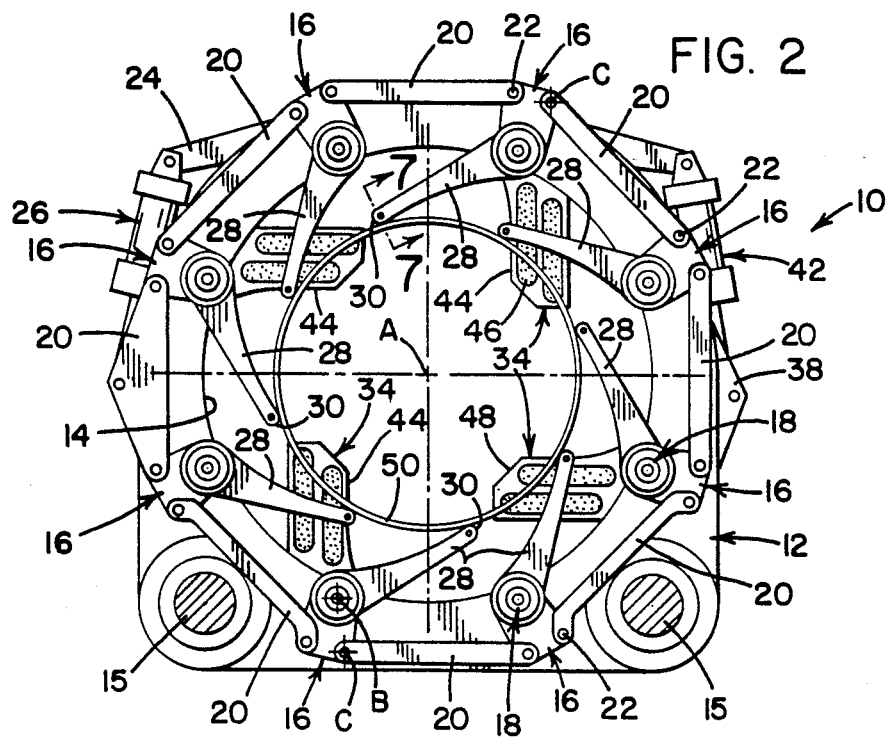

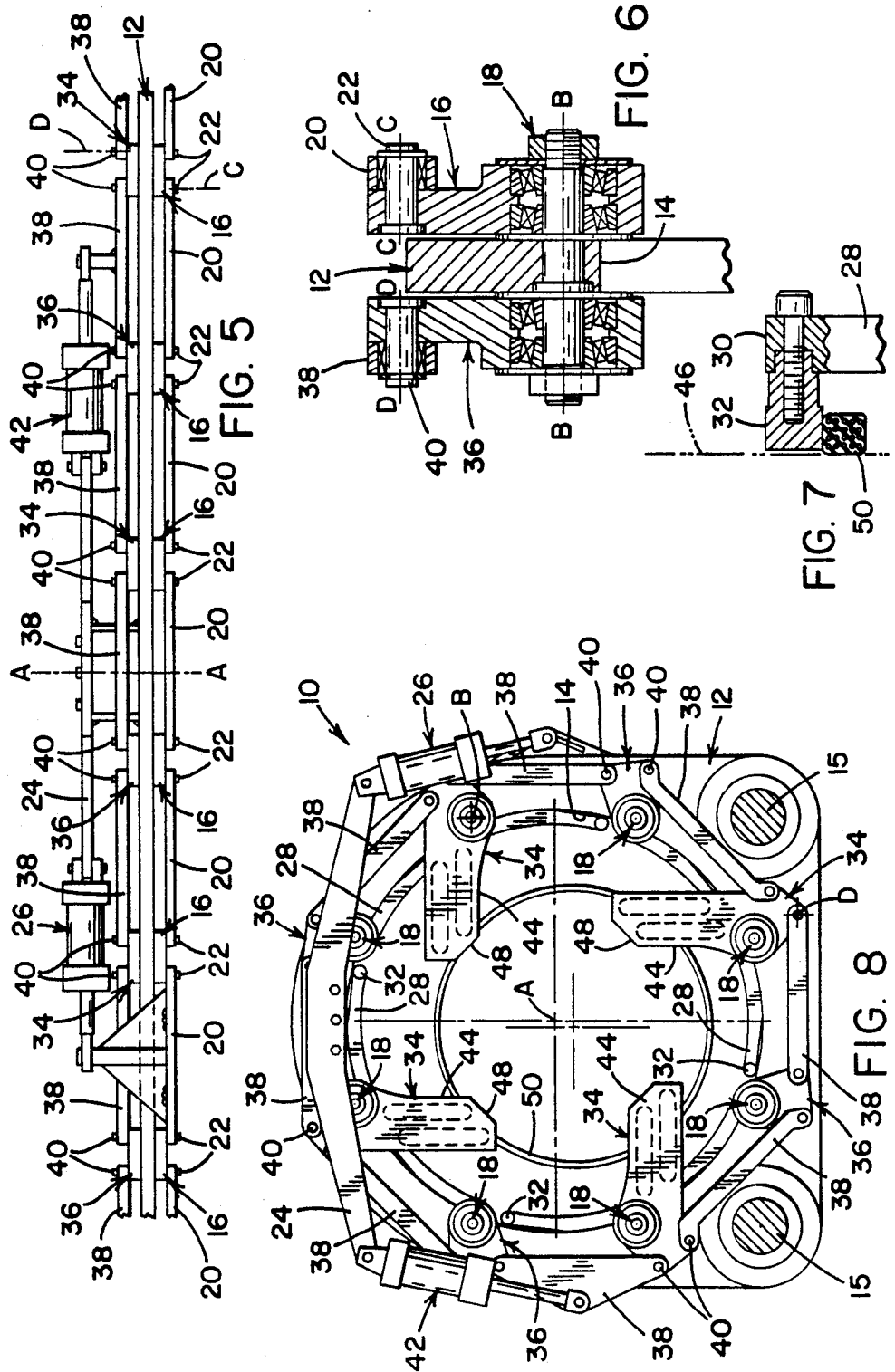

TIRE BEAD SETTER APPARATUS AND METHOD

This invention relates generally, as indicated, to handling of tire beads and especially to positioning bead rings accurately on the bead setter applier assembly so that the bead rings are concentrically located in planes perpendicular to the axis of the drum for the tire casing which is expanded into engagement with the beads during the tire building operation.

Heretofore, a bead setter applier assembly has been provided with magnetic segments for holding the bead rings and clamp segments for centering the bead rings. The magnetic segments and the clamp segments have been moved radially by rotation of a clamp segment cam ring and a magnetic segment cam ring which have slots for moving follower pins mounted on the clamp segments and magnetic segments. This apparatus has linear sliding mechanisms which require loose tolerances and therefore make it difficult to provide the desired bead ring concentricity and placement in a plane perpendicular to the central axis of the tire building drum.

Other bead setters have been proposed in which magnets are used to hold the bead. However, in none of these bead setters is there provided the bead concentricity and placement of the bead ring in a plane perpendicular to the central axis of the tire building drum to insure the precision building of a tire casing which is essential for meeting the quality standards required for modern tires.

The present invention is directed to a bead setter applier assembly in which there are no linear slider mechanisms. The clamp segments and magnetic segments are rotated into positions about pivotal connections containing rolling element bearings which can be held to very tight tolerances and therefore provide high bead placement accuracy with low maintenance. An overlapping clamp segment-magnetic segment relationship makes possible a greater number of clamp segments to distribute the radial gripping forces on the bead ring and thereby avoid distortion of the bead ring. The air pressure required to operate the clamp segments is also kept to a minimum so that a bead ring may be centered and rotation of the clamp segments stopped by the resistance of the bead ring without distorting the circular configuration of the bead ring.

In accordance with one aspect of the invention there is provided a bead setter applier assembly for placing a tire bead ring around a tire casing on an expandable tire building drum having a drum axis coincident with a central axis of the applier assembly comprising an annular frame member, a plurality of clamp segments pivotally mounted on the frame member at spaced-apart positions around an opening in the annular frame member, a plurality of magnetic segments pivotally mounted on the frame member at spaced-apart positions around the opening in overlapping relation to the clamp segments, a first means for rotating the magnetic segments radially inward into a bead holding position for retaining a bead ring placed over the magnetic segments, a second means connected to the clamp segments for rotating the segments radially inward into engagement with the bead ring for positioning the bead ring in a location concentric with the central axis of the bead setter applier assembly, the first means being connected to the magnetic segments for rotating the magnetic segments radially outward while the clamp segments are in engagement with the bead ring and the second means being connected to the clamp segments for moving the clamp segments radially outward after the tire building drum has been expanded to seat the bead ring on the tire casing whereby the bead setter applier assembly can be moved away from the drum.

In accordance with another aspect of the invention there is provided a method of holding and positioning a tire bead ring on a bead setter applier assembly for placing the tire bead ring around a tire casing on an expandable tire building drum having a drum axis coincident with a central axis of the applier assembly wherein the applier assembly has an annular frame member, a plurality of clamp segments pivotally mounted on the frame member at spaced-apart positions around an opening in the frame member, a plurality of magnetic segments pivotally mounted on the frame member at spaced-apart positions around the opening in overlapping relation to the clamp segments and means for rotating the clamp segments and the magnetic segments radially inward and outward on the frame member comprising:

(a) rotating the magnetic segments radially inward to radially inward positions;

(b) placing a bead ring on the magnetic segments;

(c) rotating the clamp segments radially inward into engagement with the bead ring to position the bead ring in a location concentric with the central axis of the applier assembly and hold the bead ring in the location;

(d) rotating the magnetic segments radially outward out of engagement with the bead ring; and (e) rotating the clamp segments radially outward after the tire casing is expanded into contact with the bead ring so that the bead setter applier assembly can be moved away from the drum.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

IN THE ANNEXED DRAWINGS

FIG. 1 is a front elevation of the bead setter applier assembly embodying the invention showing the magnetic segments in radially inward positions with a bead ring placed on the segments.

FIG. 2 is a view like FIG. 1 showing the clamp segments in the radially inward position for centering the bead ring.

FIG. 5 is a developed plan view showing the actuating cylinders taken along line 5—5 in FIG. 4 with parts being broken away.

FIG. 6 is an enlarged fragmentary sectional view taken along line 6—6 in FIG. 1 showing the pivotal connections of the links and segments.

FIG. 7 is an enlarged fragmentary sectional view taken along line 7—7 in FIG. 2 showing the bead engaging pin.

FIG. 8 is a rear elevation of the bead setter applier assembly shown in FIG. 1 with the magnetic segments in radially inward positions.

Figure 3:
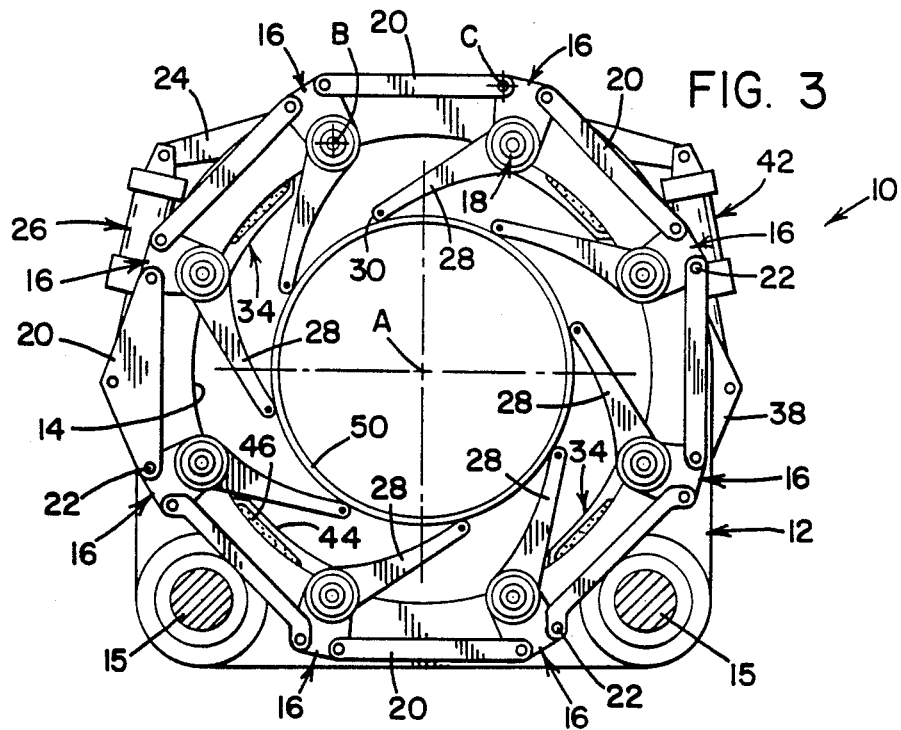
FIG. 3 is a view like FIG. 2 showing the bead ring supported by the clamp segments with the magnetic segments retracted to radially outward positions.
Figure 4:
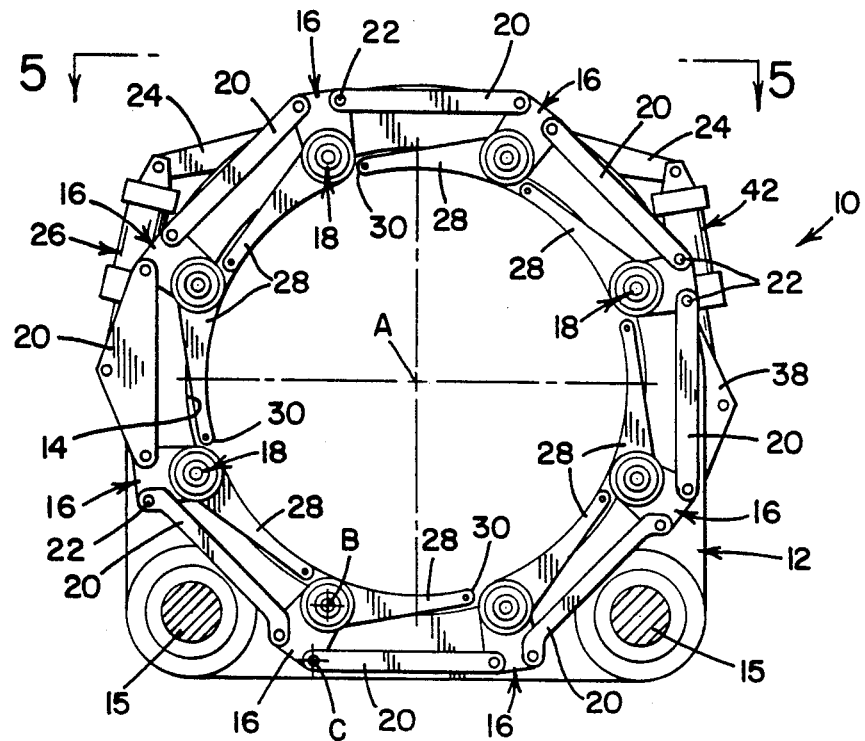
FIG. 4 is a view like FIG. 3 with the clamp segments also retracted to radially outward positions.

Referring to FIGS. 1, 2, 3, and 4, front views of the bead setter applier assembly 10 are shown with the apparatus in the different positions for performing the method of this invention. The bead setter applier assembly 10 has an annular frame member 12 which may be a steel plate having a circular opening 14 with a center at a central axis A—A of the bead setter applier assembly. The annular frame member 12 has supporting rods 15 for mounting on a carriage or other suitable transfer mechanism with the central axis A—A coincident with the axis of the tire building drum on which a tire casing is built. Apparatus for moving bead setters into predetermined positions over tire building drums is well known in the art.

Referring to FIG. 1, clamp segments 16 are pivotally mounted on the annular frame member 12 at pivotal connections such as the shaft and bearing assembly 18, shown in greater detail in FIG. 6. In this embodiment, there are eight clamp segments 16 rotatable about eight shaft and bearing assemblies 18 equally spaced around the opening 14 of the annular frame member 12. The clamp segments 16 are connected by links 20 pivotally connected to the clamp segments at positions radially outward of the shaft and bearing assembly 18 at pivot points 22. An axis B—B of each shaft and bearing assembly 18 and an axis C—C of each of the pivot points 22 on the clamp segments 16 are disposed so that the axis C—C for each link 20 is the same distance from the axis B—B of each of the clamp segments 16 and the length of the links 20 measured between each axis C—C is the same as the distance between each axis B—B and the adjacent axis B—B for adjacent clamp segments 18. This provides a parallelogram positioning of the links 20 and clamp segments 16 making possible free rotation of the segments without binding. The links 20 also rotate each of the clamp segments 16 through the same angular distance.1 With this apparatus the operating range of bead rings 50 which can be handled is from a nominal 12-inch (30.48 cm) bead ring diameter to a nominal 17-inch (43.18 cm) bead ring diameter without increasing the outer diameter of the annular frame member 12.

As shown in FIG. 8, a yoke member 24 is mounted on the frame member 12 for supporting a piston and cylinder assembly 26 connected to one of the links 20 for moving the links circumferentially to rotate the clamp segments 16. Each of the clamp segments 16 has a clamp arm 28 extending outwardly from the shaft and bearing assembly 18 to a free end 30. A bead engaging pin 32 shown more clearly in FIG. 7 is mounted on the free end 30 of the arm 28 and extends axially of the bead setter applier assembly 10 in a direction toward the rear of the assembly. The bead engaging pin 32 is relatively short and firmly attached to the arm 28 so that there is substantially no deflection of the pin and the bead ring 50 is precisely located by each clamp arm 28.

Referring to FIG. 8 which shows a rear view of the bead setter applier assembly 10, a plurality of magnetic segments 34 are pivotally mounted on the frame member 12 at alternate shaft and bearing assemblies 18. Between the magnetic segments 34 idler segments 36 are mounted on the shaft and bearing assemblies 18 with the idler segments connected to the magnetic segments by magnetic segment links 38 at magnetic segment pivot points 40 in a manner similar to the pivotal connection of the clamp segments 16. The magnetic segments 34 and idler segments 36 are pivotally connected to provide a parallelogram positioning of the links 38 and magnetic segments and idler segments for rotation of the magnetic segments 34 and idler segments 36 without binding. For example, in FIG. 8, the distance between the axes B—B of adjacent magnetic segments 34 and idler segments 36 is the same as the distance between the axes D—D of the pivotal connections 40 at the end of each of the links 38. Also the distance between the axis B—B and the axis D—D at each of the magnetic segments 34 and each of the idler segments 36 is the same. A magnetic piston and cylinder assembly 42 is connected to the yoke member 24 and to one of the magnetic segment links 38 for moving the magnetic segment links in a circumferential direction and rotating the magnetic segments 34 and idler segments 36 about the shaft and bearing assemblies 18.

Each of the magnetic segments 34 is rotatable about the axis B—B of the shaft and bearing assembly 18 which is parallel to the central axis A—A. Each of the magnetic segments 34 has a bead ring holding arm 44 extending outwardly from the shaft and bearing assembly 18 with a bead engaging surface 46 in a plane perpendicular to the central axis A—A. Preferably the bead engaging surface 46 is smooth with permanent magnets set in the surface and held by a suitable adhesive. The magnetic segments 34 are preferably of aluminum or other nonferrous material. As shown in FIG. 8, each of the magnetic segments 34 has a sloped end surface 48 providing a circular opening within the ends of the magnetic segments in the radially inward position to open up a space for movement of a bead loading apparatus.

In operation, the piston and cylinder assembly 42 for the magnetic segments 34 and idler segments 36 is actuated to move the magnetic segments to the radially inward position shown in FIG. 1. A bead ring 50 of ferrous material is placed against the bead engaging surface 46 of each of the magnetic segments and is held in a plane perpendicular to the central axis A—A. Referring to FIG. 2, the piston and cylinder assembly 26 for the clamp segments 16 is then actuated to rotate the clamp segments in a counterclockwise direction, as shown in FIG. 2, bringing the bead engaging pin 32 of each of the segments into engagement with the outer periphery of the bead ring 50 and thereby centering the bead ring about the central axis A—A. The air pressure communicated to the piston and cylinder assembly 26 is about 15 psi (1.05 kg/cm$^2$) and the force exerted by the bead engaging pin 32 of each of the clamp segments is only sufficient to center the bead ring 50 and hold it in place. By operating at a low pressure the bearing wear is minimal. With this construction the forces exerted by the clamp segments 16 are evenly distributed and there is no distortion of the bead ring 50.

Referring to FIGS. 2 and 3, the piston and cylinder assembly 42 for the magnetic segments 34 and idler segments 36 is actuated to rotate the magnetic segments and idler segments in a counterclockwise direction sliding the bead ring 50 off the bead engaging surface 46 of each of the magnetic segments and leaving the bead ring supported evenly and concentrically on the bead engaging pin 32 of each of the clamp segments 16. In this condition, the bead setter applier assembly 10 is moved over a tire building drum supporting a tire casing (not shown) to a predetermined position where the tire casing is expanded into engagement with the bead ring 50. Thereafter the piston and cylinder assembly 26 for the clamp segments 16 is actuated to rotate the clamp segments in a clockwise direction to the positions, shown in FIG. 4, so that each clamp arm 28 is retracted and the bead setter applier assembly 10 can be removed from the predetermined position over the drum.

While a certain representative embodiment and details have been shown for the purpose of illustrating the invention, it will be apparent to those skilled in the art that various changes and modifications may be made therein without departing from the spirit or scope of the invention.

What is claimed is:

1. A method of holding and positioning a tire bead ring on a bead setter applier assembly for placing said tire bead ring around a tire casing on an expandable tire building drum having a drum axis coincident with a central axis of said applier assembly wherein said applier assembly has an annular frame member, a plurality of clamp segments pivotally mounted on said frame member at spaced-apart positions around an opening in said frame member, a plurality of magnetic segments pivotally mounted on said frame member at spaced-apart positions around said opening in overlapping relation to said clamp segments; each of said magnetic segments being rotatable about an axis parallel to said central axis of said bead setter applier assembly and each of said magnetic segments having a smooth bead engaging surface in a plane perpendicular to said central axis whereby said bead ring held on said bead engaging surface is maintained in a plane perpendicular to said axis, and means for rotating said clamp segments and said magnetic segments radially inward and outward on said frame member comprising:
   (a) rotating said magnetic segments radially inward to radially inward positions;
   (b) placing a bead ring on said bead engaging surface of each of said magnetic segments;
   (c) rotating said clamp segments radially inward into engagement with said bead ring to position said bead ring in a location concentric with said central axis of said applier assembly and hold said bead ring in said location;
   (d) rotating said magnetic segments radially outward sliding said bead ring off said smooth bead engaging surface and leaving said bead ring supported evenly and concentrically by said clamp segments; and
   (e) rotating said clamp segments radially outward after said tire casing is expanded into contact with said bead ring so that said bead setter applier assembly can be moved away from said drum.

2. A bead setter applier assembly for placing a tire bead ring around a tire casing on an expandable tire building drum having a drum axis coincident with a central axis of said applier assembly comprising an annular frame member, a plurality of clamp segments pivotally mounted on said frame member at spaced-apart positions around an opening in said annular frame member, a plurality of magnetic segments pivotally mounted on said frame member at spaced-apart positions around said opening in overlapping relations to said clamp segments, each of said magnetic segments being rotatable about an axis parallel to said central axis of said bead setter applier assembly and each of said magnetic segments having a bead engaging surface in a plane perpendicular to said central axis whereby said bead ring held on said bead engaging surface is maintained in a plane perpendicular to said axis, a first means for rotating said magnetic segments radially inward into a bead holding position for retaining a bead ring placed over said magnetic segments, a second means connected to said clamp segments for rotating said clamp segments radially inward into engagement with said bead ring for positioning said bead ring in a location concentric with said central axis of said bead setter applier assembly, said first means being connected to said magnetic segments radially outward to retract said magnetic segments from said bead ring while said clamp segments are in engagement with said bead ring and slide said bead ring off said smooth bead engaging surface leaving said bead ring supported evenly and concentrically and said second means being connected to said clamp segments for moving said clamp segments radially outward after said tire building drum has been expanded to seat said bead ring on said tire casing whereby said bead setter applier assembly can be moved away from said drum.

3. The bead setter applier assembly of claim 1 wherein a portion of said bead engaging surface of each of said magnetic segments includes permanent magnets for holding a bead ring of ferrous material on said segments.

4. The bead setter applier assembly of claim 2 wherein said magnetic segments are connected by links at pivot points spaced from the pivotal connections of said segments to said frame member to provide for simultaneous rotation of all of said magnetic segments to radially outward positions and radially inward positions of said magnetic segments.

5. The bead setter applier assembly of claim 4 wherein said first means includes a piston and cylinder assembly mounted on said frame member and connected to at least one of said magnetic segments.

6. The bead setter applier assembly of claim 2 wherein said clamp segments are connected by links at pivot points spaced from the pivotal connection of said segments to said frame member for simultaneous rotation of all of said clamp segments to radially inner positions in engagement with said bead ring for locating said bead ring concentric with said axis of said bead setter applier assembly.

7. The bead setter applier assembly of claim 6 wherein each of said links is connected to said pivot points of adjacent clamp segments at positions radially outward of said pivotal connection of each of said clamp segments to said frame member to form a parallelogram whereby said adjacent clamp segments are rotated simultaneously through the same angular distance to form a circle at the free ends of said segments.

8. The bead setter applier assembly of claim 6 wherein said second means includes a piston and cylinder assembly mounted on said frame member and connected to at least one of said clamp segments.

* * * * *